United States Patent Office 3,006,752
Patented Oct. 31, 1961

3,006,752
TRITHIOPHOSPHITES AS DEFOLIANTS
Lyle D. Goodhue, Bartlesville, Okla., assignor to Phillips Petroleum Company, a corporation of Delaware
No Drawing. Filed Apr. 22, 1958, Ser. No. 730,047
4 Claims. (Cl. 71—2.7)

This invention relates to plant defoliating agents and their application to the defoliation of plants. In one aspect of the invention, it relates to the provision of tritertiary alkyl trithiophosphites as ingredients of defoliating compositions. In another aspect of the invention, it relates to the application of tritertiary alkyl trithiophosphites, especially tritertiary butyl trithiophosphite, to plants, at certain times, to cause defoliation of the same. In still another aspect of this invention, there are provided compositions for defoliating plants which comprise as an essential ingredient a tritertiary alkyl trithiophosphite, especially tritertiary butyl trithiophosphite. In still another aspect of the invention, it relates to the provision of a tritertiary alkyl trithiophosphite in combination with certain organic polysulfides as essential ingredients of plant defoliating compositions.

Plant defoliating agents are used to expedite the harvest of cotton, tomatoes, beans, and other crops. Their purpose is to provide an effect similar to that produced by a light frost which causes dropping of the leaves from the plants. In the case of cotton, defoliation is especially advantageous whether the crop is picked mechanically or by hand. In defoliated cotton, the increased exposure to the sun and the drying action of air movement causes mature bolls to open faster, prevent or reduce boll rot, and retard fiber and seed deterioration. Picking is simplified when the plants are defoliated. Mechanical harvest by either pickers or strippers is more efficient in fields that have been defoliated, since leaves that would clog the machinery have already been removed. Other advantages of cotton defoliation are that it aids in insect control, eliminates a source of green stain to lint, and reduces leaf trash which would be difficult to remove from the lint at the gin. Still another advantage of defoliation is that the crop can be harvested earlier, that is, prior to frost and wet weather conditions, and a better product can thus be obtained.

The value of various organic materials as plant defoliating agents is well known. For example, organic sulfides such as the alkyl polysulfides are known plant defoliating agents. Also, the use of various tri-alkyl trithiophosphites as the active component in compositions used for plant defoliation has been taught. However, it has also been disclosed by the prior art that tritertiary butyl trithiophosphite is inactive as a defoliant when sprayed on cotton leaves in concentrations ranging from 1,250 p.p.m. to 20,000 p.p.m.

In accordance with the present invention, contrary to the teachings of the prior art, I have found that certain tritertiary alkyl trithiophosphites are effective plant defoliants. More particularly, in accordance with the present invention, I provide plant, such as cotton, defoliating compositions comprising as an essential ingredient tritertiary butyl trithiophosphite in admixture with a defoliant adjuvant carrier, preferably a hydrocarbon solvent, ordinarily an isoparaffinic hydrocarbon fraction boiling in the range of 260 to 800 F. derived from the alkylation of paraffins with olefins.

Further, in accordance with the present invention, I provide plant defoliating compositions comprising as essential defoliant ingredients a tritertiary alkyl trithiophosphite compound, especially a tritertiary butyl trithiophosphite, and an alkyl polysulfide, especially ditertiary butyl polysulfide, in admixture with a defoliant adjuvant carrier, preferably a hydrocarbon solvent, ordinarily an isoparaffinic hydrocarbon fraction boiling in the range of 260 to 800 F. derived from the alkylation of paraffins with olefins.

Thus, according to this invention, there is provided a method for the defoliation of a plant, particularly cotton, which comprises applying to said plant a tritertiary alkyl trithiophosphite alone or in combination with an organic sulfide, especially an alkyl polysulfide, such as ditertiary butyl trisulfide in particular, in admixture with a defoliant adjuvant carrier.

Typical organic sulfide compounds that can be employed as a defoliating agent along with the tritertiary alkyl trithiophosphites of the present invention include ditertiary hexyl disulfide, ditertiary octyl disulfide, ditertiary decyl disulfide, ditertiary butyl trisulfide, ditertiary hexyl polysulfide, and the like.

Compounds used according to the invention are well known and can be prepared according to methods available in the literature. For example, one known method for preparing the tritertiary alkyl trithiophosphites, especially tritertiary butyl trithiophosphite, comprises the reaction of phosphorus trihalides with alkyl mercaptans containing from 3 to 5 carbon atoms per molecule as disclosed in U.S. Patent 2,682,554, W. W. Crouch et al. One known method for the production of alkyl disulfide compounds comprises the oxidation of the corresponding alkyl mercaptans. The alkyl polysulfides, that is, compounds having three or more sulfur atoms, can be prepared by the addition of sulfur to an alkyl disulfide over a suitable catalyst, or by other conventional procedures known to the art, such as the interaction of alkyl mercaptans with sulfur chloride, thionyl chloride, and the like, all of these methods being disclosed in U.S. Patent 2,723,910, Lyle D. Goodhue et al.

The defoliating agents of the present invention are effective when applied to plants in any suitable form such as solutions, emulsions, aerosols, fogs, or dusts. When fogging methods are employed, temperatures in fog generating devices should be below the decomposition temperature of the defoliants. Compounds of the present invention can also be advantageously adaptable for application by aircraft as mechanical dispersions or mists produced by high velocity air jet devices.

Any suitable carrier or solvent may be employed which is inert with respect to the active defoliating agent and which will not produce a harmful effect on cotton, tomatoes, beans, or other crops when applied thereto. A preferred method of applying defoliating agents of the present invention is as a dispersion or solution in a liquid carrier or solvent. Examples of suitable carriers or solvents are kerosene, fuel oil, naphtha, diesel fuel, and the isoparaffinic hydrocarbon oils which boil in the range from about 260 to 800 F. Carriers or solvents which are particularly applicable and frequently preferred are the isoparaffinic hydrocarbon oils which boil in the range from about 260 to 800 F., preferably from 300 to 600 F., and include isoparaffins such as are obtained in the alkylation of paraffins with olefins using such catalysts as hydrogen fluoride, aluminum chloride, sulfuric acid, or the like. Other solvents or carriers which are applicable are the disulfides, for example, ditertiary octyl disulfide. Talc, kieselguhr, and other inert carriers can be used in preparing dusts.

Defoliants of the present invention are effective when applied in amounts in the range between 0.02 and 50 pounds per acre, preferably in amounts in the range between 0.2 and 10 pounds per acre. The amount of carrier can be varied over a broad range. When a liquid carrier, for example, a hydrocarbon oil of the type described, is employed, the defoliating solution or dispersion will contain from 0.01 to 50 percent by weight based on the carrier of one of the defoliating agents of the present invention, preferably in the range from 0.5 to 25 percent by weight on the same basis is ordinarily employed. The tritertiary alkyl trithiophosphite and the organic polysulfide are present in my binary defoliant compositions in a ratio of from 1:10 to 10:1, preferably 1:4 to 4:1, by weight.

*Example I*

Two hundred cc. of a one percent solution of tritertiary butyl trithiophosphite in HF alkylate (an isoparaffinic hydrocarbon fraction boiling in the range 384–522 F.) was applied to 8 to 10 feet of a mature cotton row in which the plants were about knee-high. This solution was applied by means of a one-quart "Sure Shot" brand sprayer, using 100 p.s.i. carbon dioxide pressure. After one week, the cotton plants which had been sprayed with this solution were defoliated 48 percent, and the remaining leaves on the plants were green.

*Example II*

In another run, a solution of 0.8 percent by weight tertiary butyl polysulfide (50 parts sulfur) and 0.2 percent by weight of tritertiary butyl trithiophosphite in HF alkylate was applied to cotton plants. In this run, 200 cc. of this solution was applied to 8 to 10 feet of a cotton row containing plants about knee-high. Application of the solution was made in the same manner as described in Example I. The cotton plants were 87 percent defoliated after one week, and the leaves of these plants were a mixture of green and brown.

Reasonable variation and modification are possible within the scope of the foregoing disclosure and the appended claims to the invention, the essence of which is that certain tritertiary alkyl trithiophosphites in certain solvents, as set forth, and binary defoliant compositions comprising certain tritertiary alkyl trithiophosphites and alkyl polysulfides in certain solvents, as set forth, have been found to possess defoliating properties.

I claim:
1. A method for defoliating cotton which comprises applying to the mature plant a defoliating quantity of tritertiary butyl trithiophosphite dispersed in an isoparaffinic hydrocarbon fraction boiling in the range 260–800° F.
2. A method according to claim 1 wherein 0.02 to 50 pounds per acre of said tritertiary butyl trithiophosphite is applied.
3. A method for defoliating cotton which comprises applying thereto, in a quantity sufficient to cause defoliation of said cotton, tritertiary butyl trithiophosphite dispersed in a highly-branched isoparaffinic hydrocarbon fraction boiling in the range 260–800° F., said trithiophosphite being present in the defoliating composition in a range from 0.01 to 50 percent by weight based on said hydrocarbon fraction.
4. A method according to claim 3 wherein the defoliating agent is applied in amounts ranging from 0.2 to 10 lbs. per acre.

References Cited in the file of this patent
UNITED STATES PATENTS

| | | |
|---|---|---|
| 2,269,396 | Jayne | Jan. 6, 1942 |
| 2,682,554 | Crouch et al. | June 29, 1954 |
| 2,704,246 | Goodhue et al. | Mar. 15, 1955 |
| 2,722,479 | Mangham | Nov. 1, 1955 |
| 2,723,910 | Goodhue et al. | Nov. 15, 1955 |
| 2,819,290 | McLeod et al. | Jan. 7, 1958 |
| 2,836,535 | Birum | May 27, 1958 |
| 2,841,486 | Osborn et al. | July 1, 1958 |

OTHER REFERENCES

Proceedings of Eleventh Annual Beltwide Cotton Defoliation and Physiology Conference, published by National Cotton Council, Memphis, Tenn., Dec. 12, 1956, pages 9 to 14.